Nov. 9, 1943.                D. R. STAMY                 2,333,827
                        PERISCOPIC VISION DEVICE
                        Filed Dec. 20, 1941           2 Sheets-Sheet 1

INVENTOR
DAVID R. STAMY
BY
*Hyde and Meyer*
ATTORNEYS

Nov. 9, 1943.　　　D. R. STAMY　　　2,333,827
PERISCOPIC VISION DEVICE
Filed Dec. 20, 1941　　　2 Sheets-Sheet 2

INVENTOR
DAVID R. STAMY
BY
*Hyde and Nager*
ATTORNEYS

Patented Nov. 9, 1943

2,333,827

UNITED STATES PATENT OFFICE 2,333,827

PERISCOPIC VISION DEVICE

David R. Stamy, Huntington Woods, Mich., assignor to The Standard Products Company, Detroit, Mich., a corporation of Ohio Application December 20, 1941, Serial No. 423,773

5 Claims. (Cl. 88—1)

The invention relates to an improved vision device for use chiefly for military purposes. It particularly relates to a novel and improved periscopic device which protects an observer behind a barrier or bulkhead from direct impact of projectiles or flying missiles while affording him a clear and unobstructed view of objects and events on the other side of the bulkhead or barrier.

The present invention is an improvement on the device disclosed and claimed in a copending application of Harry A. Husted, Serial No. 389,277, filed April 19, 1941.

As will be apparent from the drawings, and the description thereof which follows, the invention is an improvement in indirect vision devices, namely devices which angularly divert rays of light from an object under observation through one or more successive changes in direction before said light rays meet the eye of the observer. Vision devices of this nature are obviously useful in armored tanks, airplanes, armored gun emplacements, or in any location where it is desirable and feasible to protect the operator from bullets, shrapnel, etc. With prior periscopic devices, observers have frequently suffered severe injuries from a hit on such device which practically inevitably results in the shattering of the mirrors or prismatic optical units of the device with consequent likelihood of serious damage to the observers' eyes.

In the aforesaid copending application, Serial No. 389,277, the inventor disclosed a novel optical unit containing a transparent prismatic element made from a medium of shatterproof character, the nature of which was fully disclosed in said application and will be described herein only to an extent necessary for a disclosure of the present improvements thereon.

An object of the present invention is the provision of a shatterproof prismatic element, the reflecting end surfaces of which are provided, externally thereto, with means for protecting said reflecting end surfaces from accidental or intentional impacts of destructive character.

Another object of the present invention is the provision of a shatterproof prismatic element having a reflecting surface or surfaces and a light transmitting surface or surfaces wherein each such light transmitting surface is provided with a transparent facing plate made from a material different from that of said prismatic element, such face plate material having a surface of higher hardness and abrasion resistance than that of said prismatic element, and wherein each such reflecting surface is provided, externally thereto with opaque protective means for protecting said reflecting surfaces.

Other objects and advantages of devices embodying the present invention will appear from the following description of one embodiment thereof, reference being had to the accompanying drawings, in which Fig. 1 is an elevation of a vision device and suitable housing as used in a military tank, seen from the observer's position on the interior, the tank wall being broken away.

Before the present invention is described in detail, it is to be understood that such invention is not limited to the details of construction and/or the specific arrangement of parts herein illustrated and/or described, as the invention obviously may take other forms. It also is to be understood that the phraseology or terminology herein employed is for the purpose of description and not of limitation.

With the exception of certain specific characteristics closely associated with the prismatic reflecting element itself, which specific characteristics comprise the novel features of the present invention and will be more fully described hereinbelow, the general features of the housing for the reflecting element, as illustrated in Figs. 1 to 4, are similar to those shown and described in the aforesaid Husted application, and will be described here only to an extent necessary for a comprehension of the present inventive improvement.

Figure 1:
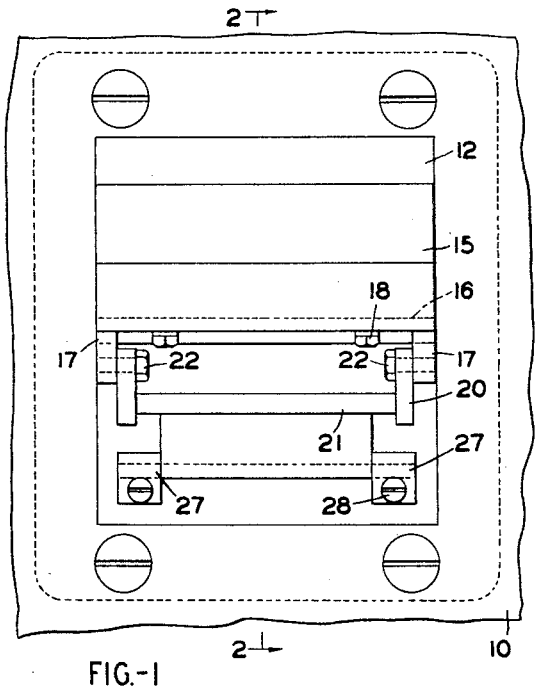
Figure 2:
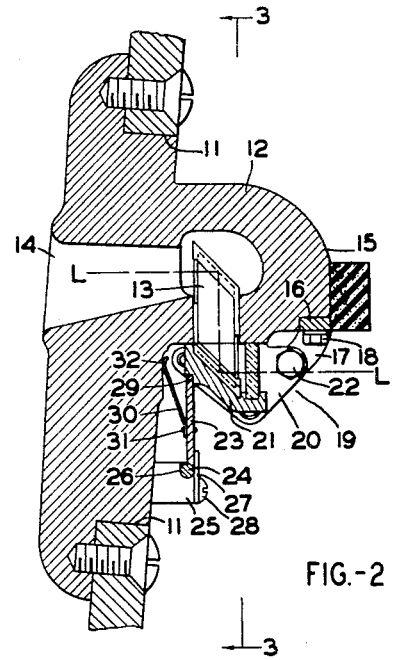
Fig. 2 is a section taken on the line 2—2 of Fig. 1.
Figure 3:
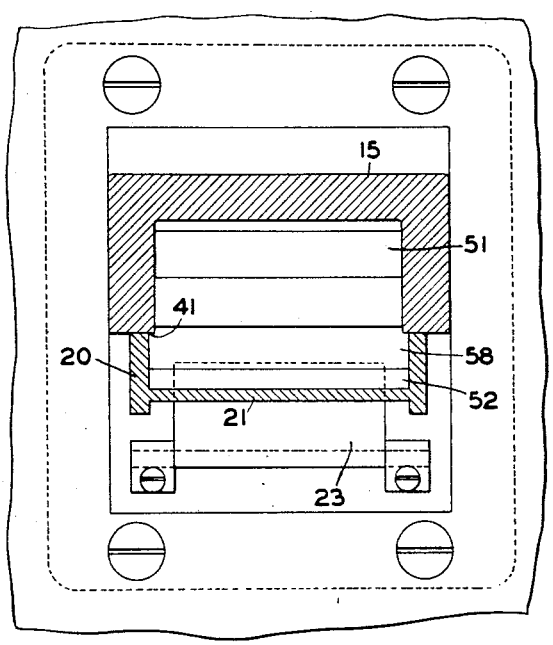
Fig. 3 is a section taken on the line 3—3 of Fig. 2.

In the drawings, an armored tank wall 10 is provided with a rectangular opening 11 in which is inserted a housing 12 to accommodate the optical unit 13. The housing is provided with an elongated horizontal opening 14 flaring outwardly towards the tank exterior, said opening constituting the zone of entry of visual rays. Housing 12 is further provided with an inwardly and downwardly extending shoulder or hood 15 laterally and vertically coextensive with opening 14 so as to prevent direct access of bullets and the like through opening 14 to the interior. A cross member 16 having at its ends two downwardly extending lugs 17 is attached to the lower rear portion of shoulder 15 by means of studs 18. A bracket 19, comprising side plates 20 carrying a transverse flange 21, is pivotally suspended from lugs 17 by means of pivot studs 22 which are threaded to seat in lugs 17. Bracket 19 is normally retained in its uppermost position, as best shown in Fig. 2, by means of a hinged locking plate 23 which is pivotally mounted at 24 in projecting lugs 25 on the lower side portions of housing 12. The locking plate may conveniently be removably seated, by means of rounded pivot pins 24 in grooved step portion 26 in lugs 25, the locking plate being normally retained in this position by face plates 27 held by screw studs 28. The locking plate 23 and cross flange 21 of bracket 19 unite to form a rabbet joint lock at 29, the locking plate being maintained in firm abutment in the rabbet joint by means of a leaf spring 30 which is affixed to plate 23 at 31 and which abuts housing 12 at 32. To release the lock, the observer depresses plate 23 towards housing 12 until it clears the rabbet groove at 29, at which time bracket 19 drops by gravity to the position shown in Fig. 4, the locking plate in Fig. 4 being shown in forcibly depressed position. While the bracket is in its downward position the locking plate may be lifted out of its seated position at 26, if desired.

The optical element which is shown in greater detail and somewhat enlarged form in Figs. 5 to 8, comprises a main body portion 13 of rhombohedral contour. In this particular embodiment the top and bottom faces, 33 and 34 respectively, are inclined at an angle of 45 degrees to the incident light rays, and to a line perpendicular to the vertical faces 35 and 36. Said body portion is made from organic plastic material of optical characteristics quite similar to glass, such material being preferably obtainable from the group of organic plastics known as the acrylates. Those skilled in the art are familiar with the fact that the acrylates are produced by the polymerization of the monomeric derivatives of acrylic and methacrylic acids. The acrylates have excellent light transmission properties, the transmission factor being in the neighborhood of 95 per cent. The acrylates are thermoplastic and are readily moldable to desired contours. A material of this type which has been found to be quite suitable is sold commercially under the trade name "Plexiglas." It crumbles harmlessly rather than shatters on severe impact such as occurs when it is struck by a bullet.

In the preferred embodiment, illustrated in detail in Figs. 5, 6, 7 and 8, I attach two strips of plate glass 37 and 38 which are provided with internally directed mirror surfaces on their respective external faces 39 and 40. The plate glass mirrored strips are cemented to the Plexiglas faces 33 and 34 by means of any suitable transparent medium of refractive index and other optical properties similar to the glass and the Plexiglas, which latter two elements are substantially identical in optical characteristics. One such adhesive is available under the trade name "Plexigum No. 845," which is preferably moistened with some wetting agent such as dibutyl phthalate. A slight amount of pressure produces the desired adhesion.

I have provided an upper and a lower cap member, numbered respectively 51 and 52, which are suitably recessed to provide a housing of socketlike character for the mirror member, although, if desired, the side walls of either or both caps might be somewhat extended to embrace a portion of the prism. In the design herein illustrated the upper cap 51 has been extended downwardly along a substantial portion of the rear longitudinal face of the prism, as shown at 53, and the lower cap 52 has been similarly extended upwardly along the front longitudinal face of the prism as shown at 54. The extensions 53 and 54 furnish protection for what we may term a non-working area of the prism surface. Said extensions are not in the path of any rays which may be transmitted through the prism by virtue of a successive double reflection from the mirror faces (as indicated in the case of one light ray by the dotted line L—L of Fig. 2) and therefore they, and the respective caps integral therewith, may be fabricated from opaque material of suitable physical characteristics, for instance any of the known synthetic plastics now available. In preferred form they can be fabricated from a thermoplastic resin by a pressure casting operation.

Figure 5:
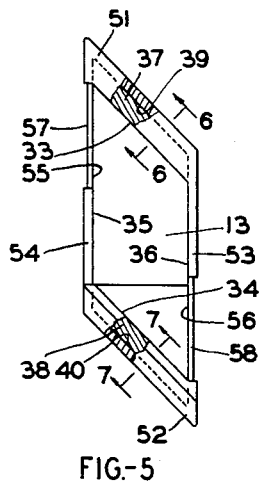
Fig. 5 is a side elevation of the prismatic element of my vision device, showing the protective caps for the reflecting surfaces and the transparent facing plates for the light transmitting surfaces, the caps being partially broken away.
Figure 6:
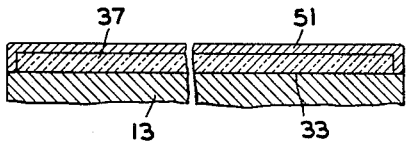
Fig. 6 is a section taken on the line 6—6 of Fig. 5.
Figure 7:
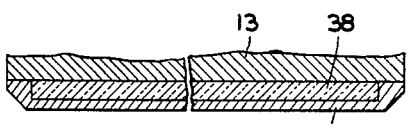
Fig. 7 is a section taken on the line 7—7 of Fig. 5.
Figure 8:
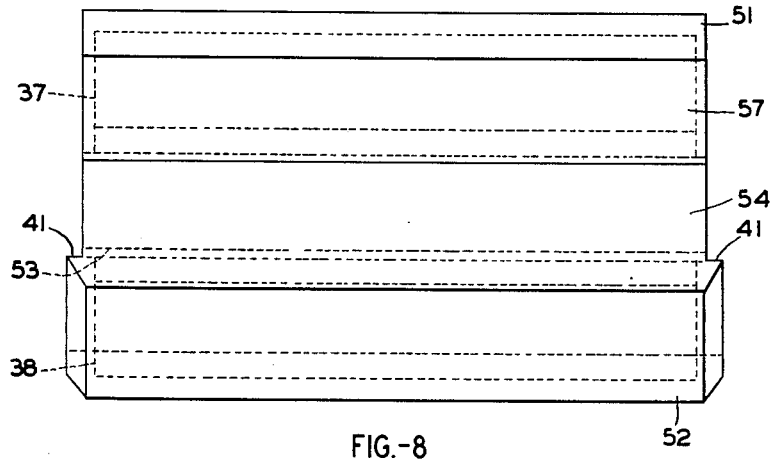
Fig. 8 is a front elevation from the left of Fig. 5.
Figure 9:
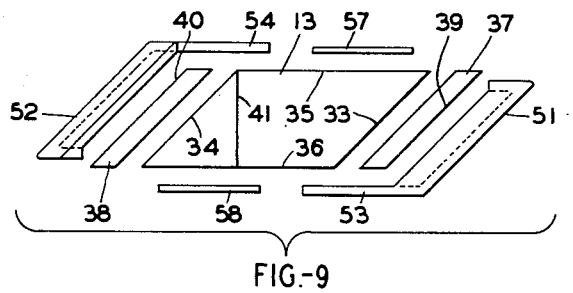
Fig. 9 is a view showing the optical unit of Fig. 5 in an "exploded" condition, the elements thereof being spaced somewhat apart.

Those portions of the front and rear prism faces not covered by the cap projections 54 and 53, and comprising horizontal rectangular light transmitting areas 55 and 56 (Fig. 5) respectively, are provided with transparent protective shields respectively numbered 57 and 58. These shields are preferably formed of glass of good optical quality, and they serve to protect the light transmitting prism faces from abrasion and weathering. The scratch hardness of the shatterproof prism material is not quite as high as that of glass, nor is the surface of the prism quite as resistant to injurious weathering. The disposal of the glass shields in the manner shown permits the handling and cleaning of the exterior light transmitting surface without the exercise of other than ordinary care. As a further protective measure the exposed surfaces of shields 57 and 58 are depressed slightly below the plane of the outer surfaces of the caps as best seen in Fig. 5. This precaution protects the glass surface during insertion of the optical element in its housing, or withdrawal therefrom, or from the injurious consequences of careless handling of the element while out of the housing.

Figure 4:
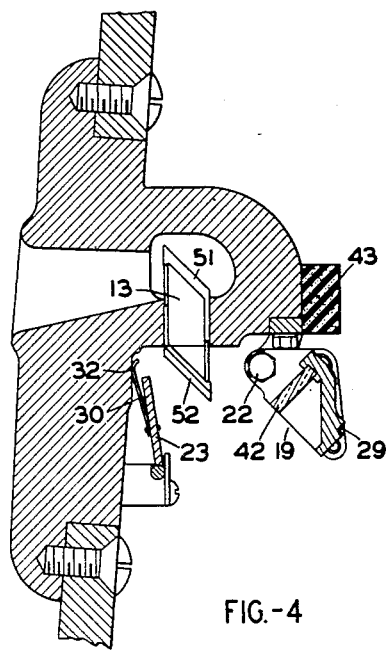
Fig. 4 is a section taken similarly to Fig. 2 but showing the bracket, which supports the optical unit swung back to a position permitting removal of said unit.

The optical element thus assembled is inserted upwardly in the space between housing 12 and shoulder 15 when the bracket 19 is swung to the position shown in Fig. 4. The lateral faces of the prism are provided with a slight offset 41 (Figs. 3 and 8) which serves as a stop when the offset abuts against the side portions of shoulder 15. When bracket 19 is swung upwardly to locked position the cross flange 21 abuts the external face of the lower cap 52, thereby maintaining the optical unit in viewing position.

Cross flange 21 also carries, in preferred form, a transparent shielding plate 42, likewise of shatterproof material, such as "Lucite," which minimizes the danger of injury to the operator from flying fragments of any nature. Plate 42 plays no part in light diversion, being positioned in a plane normal to the path of the light rays.

A single incident ray of light L—L is shown in dotted line in Fig. 2, the angles of incidence and reflection at each mirror surface following the conventional path.

A number of spare optical units are regularly carried in some conveniently available position and if the unit in use is damaged, the observer, operator or the like presses locking plate 23 forward, whereupon bracket 19 instantly drops so as to clear the bottom of the prism, the prism then dropping by gravity. A new unit is immediately inserted and the bracket is swung upwardly to locked position. The plate 42 may be adhesively retained in its seating groove in cross flange 21 or may be otherwise removably fixed in place.

A strip of resilient cushioning material 43 is provided, against which the observer may rest his forehead while the described viewing device is in operation. It also serves to cushion collisions between the observer's head and the hood, such as may be expected on sudden unexpected stops of the tank or structure in which is mounted the present device.

I have described a preferred embodiment wherein plane mirrors 37 and 38, silvered on their external surface, provide the reflecting surfaces. These mirrors may be inverted and their silvered surfaces suitably disposed so that these silvered surfaces are in actual contact with the angular prism faces, instead of being spaced therefrom by the thickness of the glass supporting the silver plating.

It is also obvious that very satisfactory results can be obtained by imparting to the angular prism surfaces 33 and 34 an optically flat surface finish so as to cause light reflection within the prism without the use of supplementary mirror surfaces, said light ray diversion being achieved with little loss at the reflecting faces.

A highly efficient and exceptionally simple unit may be constructed by depositing on the reflecting surfaces of the prism described in the preceding paragraph a thin layer of a metal having a high coefficient of reflectivity. Such a mirror surface may be obtained, for example, by condensation of vaporized aluminum in a vacuum, in a manner generally known, or by application of a silver or chromium coating by one of a number of familiar methods.

Whether the optical unit be used without a supplementary mirror, or with such mirror in any of the several arrangements described above, the prism in all cases is provided with the protective cap devices and with the transparent shielding plates already fully described and illustrated.

It is further obvious that while reference has here been made to an optical unit involving a plurality of light diverting surfaces, two being specifically shown and described, convenience may dictate the use of a unit having only one angularly disposed reflecting surface which would divert the light to a plane at some angle to that of its incidence, the diverted rays being directed to the eye of an observer not in a direct line with the opening in a tank wall, or other housing. In such adaptation, according to the teaching of the present invention, one or more protective caps would be provided to the numerical extent required by the number of reflecting surfaces, and one or more transparent shields would be provided for the one or more exposed, light transmitting areas of the prism.

Further advantageous features of the present invention will be readily apparent to those skilled in the art to which such invention relates.

What I claim is:

1. An optical unit for a periscopic viewing device comprising a transparent, shatterproof prism having two lateral, light transmitting faces and two end faces disposed at oblique angles to said lateral faces, a plate member adhesively united to, and coextensive in area with, each said end face, each plate carrying a mirror surface directed toward said prism, whereby a light ray passing inwardly through one of said light transmitting faces is diverted from its original path by said mirror surface and toward said other mirror surface, a pair of protective caps, one said cap having a portion thereof embacing one said mirrored plate element and another portion thereof extending partially along one lateral face, the other said cap having a portion thereof embracing the other said mirrored plate element and another portion thereof extending partially along the other lateral face, the portions of said lateral faces not covered by said cap portion, and constituting the actual light transmitting areas of said lateral faces, having thereupon transparent shielding plates of material more resistant to abrasion than the material of said prism.

2. An optical unit for a periscopic viewing device comprising a transparent, shatterproof prism having two lateral, light transmitting faces and two end faces disposed at oblique angles to said lateral faces, a transparent plate member adhesively united to, and coextensive in area with, each said end face, and carrying upon its surface remote from said end face a mirror surface directed toward said prism, whereby a light ray passing inwardly through one of said light transmitting faces is diverted from its original path by said mirror surface and toward said other mirror surface, a pair of protective caps, one said cap having a portion thereof embracing one said mirrored plate element and another portion thereof extending partially along one lateral face, the other said cap having a portion thereof embracing the other said mirrored plate element and another portion thereof extending partially along the other lateral face, the portions of said lateral faces not covered by said cap portion, and constituting the actual light transmitting areas of said lateral faces, having thereupon transparent shielding plates of material more resistant to abrasion than the material of said prism.

3. An optical unit for a periscopic viewing device comprising a transparent, shatterproof prism having two lateral, light transmitting faces and two end faces disposed at oblique angles to said lateral faces, a plate member in contact with, and coextensive in area with, each said end face and carrying upon its surface adjacent said end face a mirror surface directed toward said prism, whereby a light ray passing inwardly through one of said light transmitting faces is diverted from its original path by said mirror surface and toward said other mirror surface, a pair of protective caps, one said cap having a portion thereof embracing one said mirrored plate element and another portion thereof extending partially along one lateral face, the other said cap having a portion thereof embracing the other said mirrored plate element and another portion thereof extending partially along the other lateral face, the portions of said lateral faces not covered by said cap portion, and constituting the actual light transmitting areas of said lateral faces, having thereupon transparent shielding plates of material more resistant to abrasion than the material of said prism.

4. An optical unit for a periscopic viewing device comprising a transparent, shatterproof prism having two lateral, light transmitting faces and two end faces disposed at oblique angles to said lateral faces, each said end face carrying thereon a mirror surface directed toward said prism, whereby a light ray passing inwardly through one of said light transmitting faces is diverted from its original path by said mirror surface and toward said other mirror surface, a pair of protective caps, one said cap having a portion thereof embracing one said mirrored surface and another portion thereof extending partially along one lateral face, the other said cap having a portion thereof embracing the other mirrored surface and another portion thereof extending partially along the other lateral face, the portions of said lateral faces not covered by said cap portion, and constituting the actual light transmitting areas of said lateral faces, having thereupon transparent shielding plates of material more resistant to abrasion than the material of said prism.

5. An optical unit for a periscopic viewing device comprising a transparent, shatterproof prism having two lateral, light transmitting faces and two end faces disposed at oblique angles to said lateral faces, a plate member adhesively united to, and coextensive in area with, each said end face, each plate carrying a mirror surface directed toward said prism, whereby a light ray passing inwardly through one of said light transmitting faces is diverted from its original path by said mirror surface and toward said other mirror surface, a pair of protective caps, one said cap having a portion thereof embracing one said mirrored plate element and another portion thereof extending partially along one lateral face, the other said cap having a portion thereof embracing the other said mirrored plate element and another portion thereof extending partially along the other lateral face, the portions of said lateral faces not covered by said cap portion, and constituting the actual light transmitting areas of said lateral faces, having thereupon transparent shielding plates of material more resistant to abrasion than the material of said prism, the external surface of each said shielding plate being depressed somewhat below the plane of the external surface of the cap portions adjacent thereto.

DAVID R. STAMY.